US 10,376,958 B2
… Aug. 13, 2019

(12) United States Patent
Vogt et al.

(10) Patent No.: US 10,376,958 B2
(45) Date of Patent: Aug. 13, 2019

(54) REMOVABLE SUPPORT FOR ADDITIVE MANUFACTURE

(71) Applicant: General Electric Company, Schenectady, NY (US)

(72) Inventors: Ernst Vogt, Remigen (CH); Fabian Gubelmann, Buchs (CH); Dariusz Oliwiusz Palys, Gebenstorf (CH)

(73) Assignee: General Electric Company, Schenectady, NY (US)

( * ) Notice: Subject to any disclaimer, the term of this patent is extended or adjusted under 35 U.S.C. 154(b) by 372 days.

(21) Appl. No.: 15/266,472

(22) Filed: Sep. 15, 2016

(65) Prior Publication Data

US 2018/0071822 A1    Mar. 15, 2018

(51) Int. Cl.
| | |
|---|---|
| *B22F 3/105* | (2006.01) |
| *B33Y 10/00* | (2015.01) |
| *G05B 19/4099* | (2006.01) |
| *B29C 64/153* | (2017.01) |
| *B29C 64/40* | (2017.01) |

(Continued)

(52) U.S. Cl.
CPC .......... *B22F 3/1055* (2013.01); *B29C 64/153* (2017.08); *B29C 64/40* (2017.08); *B33Y 10/00* (2014.12); *G05B 19/4099* (2013.01); *B22F 5/009* (2013.01); *B22F 5/04* (2013.01); *B22F 2003/1058* (2013.01); *G05B 2219/35134* (2013.01); *G05B 2219/49007* (2013.01); *Y02P 90/265* (2015.11)

(58) Field of Classification Search
CPC .......... B22F 3/1055; B22F 2003/1058; B33Y 10/00; B29C 64/153; B29C 64/40; G05B 19/4099; G05B 2219/35134; G05B 2219/49007; Y02P 90/265

See application file for complete search history.

(56) References Cited

U.S. PATENT DOCUMENTS 6,309,581 B1 * 10/2001 Gervasi ................ B29C 64/135
                                                                    264/308
9,283,716 B2     3/2016 Swanson et al.
(Continued)

FOREIGN PATENT DOCUMENTS

DE     102015119746 A1 *   5/2017  ............. B23H 9/001

OTHER PUBLICATIONS

DE-102015119746-A1 (Machine Translation) (Year: 2015).*

*Primary Examiner* — Kevin E Yoon
*Assistant Examiner* — Ryan L Heckman
(74) *Attorney, Agent, or Firm* — Dale Davis; Hoffman Warnick LLC

(57) ABSTRACT

Aspects of the disclosure include a removable support for additive manufacture and methods and code for manufacturing and removing the same. A removable support for a laser-sintered component having at least one surface to connect to may include a support body, a first set of connectors, and a second set of connectors. The support body may have a first wing and a second wing, each with a distal surface and a lateral midline bisecting the distal surface. Each set of connectors may project from the distal surface on one side of the lateral midline of their respective wings to connect to the surface of the component while the distal surface also defines a connector-free portion on the other side of the lateral midline.

20 Claims, 4 Drawing Sheets

(51) Int. Cl.
*B22F 5/00* (2006.01)
*B22F 5/04* (2006.01)

(56) References Cited

U.S. PATENT DOCUMENTS

2015/0258609 A1  9/2015 Teulet
2016/0175932 A1  6/2016 Dimter et al.

* cited by examiner

REMOVABLE SUPPORT FOR ADDITIVE MANUFACTURE

TECHNICAL FIELD

The disclosure relates generally to the removal of supports from laser-sintered components, such as those produced in additive manufacture. More particularly, embodiments of the present disclosure provide removable supports, methods for removing, and code for making supports for laser-sintered components.

BACKGROUND

The pace of change and improvement in the realms of power generation, aviation, and other fields has accompanied extensive research for manufacturing components used in these fields. Conventional manufacture of metallic components generally includes milling or cutting away regions from a slab of metal before treating and modifying the cut metal to yield a part, which may have been simulated using computer models and computer aided design. Manufactured components which may be formed from metal include airfoil components for installation in a turbomachine such as an aircraft engine or power generation system, as well as mechanical components for other manufacturing, transportation, and structural systems.

The development of additive manufacturing, also known in the art as "3D printing," can reduce manufacturing costs by allowing such components to be formed more quickly, with unit-to-unit variations as appropriate. Among other advantages, additive manufacture can directly apply computer-generated models to a manufacturing process while relying on less expensive equipment and/or raw materials.

Additive manufacturing can allow a component to be formed from a reserve of fine metal powder positioned on a build plate, which is processed by an electron beam or laser (using heat treatments such as sintering) to form a component or sub-component. Additive manufacturing equipment can also form components by using three-dimensional models generated with software included within and/or external to the manufacturing equipment. Some devices fabricated via additive manufacture can be formed initially as several distinct components at respective processing stages before being assembled in a subsequent process. One challenge associated with additive manufacturing includes maintaining the shape of a component before the manufacturing process completes. For example, some portions of a component may be structurally stable after the component has been manufactured, but may need additional structural support when some parts have not been built. Some designs may address this concern by including temporary supports which may be designed and positioned for removal after the component is manufactured. Due to variances between manufactured components and the manner in which these components are formed, the use of these supports can vary widely between component designs. The supports may also be manufactured such that they are capable of being removed only after the component is fully manufactured.

SUMMARY

A first aspect of the disclosure provides a method for removing a support from a laser-sintered component. The method includes additively manufacturing a laser-sintered component having at least one surface and a removable support extending from and connected to the at least one surface. The support includes a support body, a first set of connectors, and a second set of connectors. The support body has at least a first wing with a first distal surface and a first lateral midline bisecting the first distal surface and a second wing with a second distal surface and a second lateral midline bisecting the second distal surface. The first set of connectors projects from the first distal surface on a first side of the first lateral midline and connects to the at least one surface, wherein the first distal surface defines a first connector-free portion on the second side of the first lateral midline. The second set of connectors projects from the second distal surface on a first side of the second lateral midline and connects to the at least one surface, wherein the second distal surface defines a second connector free portion on the second side of the second lateral midline. The method further includes striking the removable support of the laser-sintered component to separate the first set of connectors and the second set of connectors from the at least one surface by twisting the support body.

A second aspect of the disclosure provides a removable support for a laser-sintered component having at least one surface. The removable support includes a support body, a first set of connectors, and a second set of connectors. The support body has at least a first wing with a first distal surface and a first lateral midline bisecting the first distal surface and a second wing with a second distal surface and a second lateral midline bisecting the second distal surface. The first set of connectors projects from the first distal surface on a first side of the first lateral midline and connects to the at least one surface, wherein the first distal surface defines a first connector-free portion on the second side of the first lateral midline. The second set of connectors projects from the second distal surface on a first side of the second lateral midline and connects to the at least one surface, wherein the second distal surface defines a second connector free portion on the second side of the second lateral midline.

A third aspect of the invention provides non-transitory computer readable storage medium storing code representative of a removable support for a laser-sintered component having at least one surface. The removable support is physically generated upon execution of the code. The removable support includes a support body, a first set of connectors, and a second set of connectors. The support body has at least a first wing with a first distal surface and a first lateral midline bisecting the first distal surface and a second wing with a second distal surface and a second lateral midline bisecting the second distal surface. The first set of connectors projects from the first distal surface on a first side of the first lateral midline and connects to the at least one surface, wherein the first distal surface defines a first connector-free portion on the second side of the first lateral midline. The second set of connectors projects from the second distal surface on a first side of the second lateral midline and connects to the at least one surface, wherein the second distal surface defines a second connector free portion on the second side of the second lateral midline.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
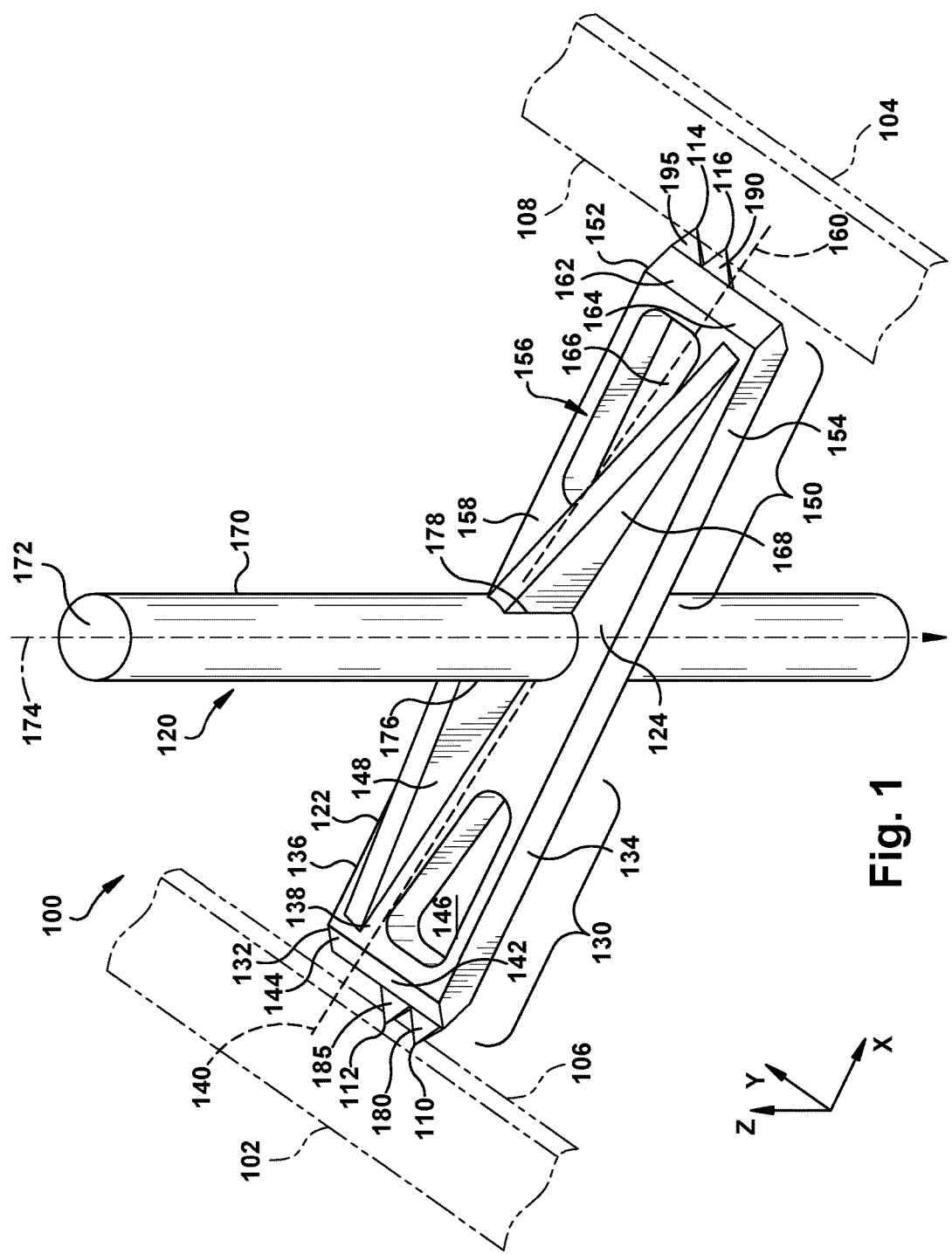
FIG. 1 provides a perspective view of an example removable support and portions of a component to which it is connected.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be used and that changes may be made without departing from the scope of the present teachings. The following description is, therefore, merely exemplary.

Where an element or layer is referred to as being "on," "engaged to," "disengaged from," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Referring to FIG. 1, the following description is directed to a laser-sintered component 100 which is additively manufactured to include a removable support 120 ("support" 120 hereafter) therein. Component 100 may form part of, or may be adaptable to form part of, a larger component and/or machine such as a power generation assembly. It will be understood, however, that component 100 may have applications other than those described by example herein. Component 100 is formed such that it has at least one surface in need of support during the additive manufacturing process and providing at least two surface connecting points with a removable support. In an example in FIG. 1, component 100 has portions 102 and 104 that may, for example, represent parallel members, part of a continuous U-shaped or elliptical member, or more complex configurations of members defining exterior, interior, and/or blind features in component 100. Portions 102, 104 may include surfaces 106, 108, which are in an opposed configuration relative to one another, though they could be part of the same larger continuous surface in some configurations. Surfaces 106, 108 may include a plurality of connection points for support 120. In the example shown, surface 106 includes connection points 110, 112 and surface 108 includes connection points 114, 116.

Embodiments of the present disclosure also include methods for removing support 120 from component 100, such that component 100 can be adapted to form part of another structure, machine, etc. For example, methods according to the present disclosure can include providing and/or manufacturing component 100 and support 120 together, before striking support 120 to mechanically separate support 120 from component 100. The dislodged support 120 can then be removed from component 100 by any conventional means for removing waste material(s) from a mechanical component. Embodiments of the present disclosure also provide an additive manufacturing file (e.g., code stored on a non-transitory computer readable storage medium) representative of and used for generating component 100 and support 120 therein.

Component 100, including support 120, may have a build direction coincident with the Z axis describing the direction in which materials were added to form the desired structure. In additive manufacture, a "build direction" of one or more components may be defined by a fabricator before raw materials are processed from raw materials into a desired structure. A build direction for a given component and/or sub-component therefore defines the order in which structural features are formed over time as raw materials (e.g., metallic powders) are sintered to form a structure. Such materials can include, e.g., one or more pure metals and/or alloys including without limitation: Copper (Cu), Chromium (Cr), Titanium (Ti), Nickel (Ni), aluminum (Al), etc. In an example embodiment, the build direction Z of component 100 can be oriented along one axis, and perpendicular to the plane of X and Y axis, and generally can be defined to assist in describing the three dimensional structure of the component, as well as the way in which it is formed. If support 120 is not manufactured with component 100, portions 102, 104 may not have substantial structural support. Forming support 120 as an integral structural portion of component 100 during manufacture can permit various structures to be formed on a plurality of supports, in addition to previously formed portions of component 100.

Component 100 may be formed with a wide variety of geometries and configurations that would supply surfaces for connecting supports. Component 100 can be shaped to form any desired geometry with interior and/or exterior surfaces in need of support, and in example embodiments may be substantially cylindrical, triangular, rectangular, polygonal, etc. As such, surfaces 106, 108 may be respective portions of a single continuous surface of component 100, but can be defined as opposing surfaces by having respective components and/or features connected thereto. Regardless of the geometrical shape and configuration of component 100, component 100 can be composed of one or more laser-sintered metals or metallic materials, e.g., those currently-known or later developed for use in an additive manufacturing process.

Support 120 can be formed together with component 100, and thus may include one or more of the same materials (e.g., laser-sintered metals and/or similar metallic components) included within component 100. Support 120 includes a support body 122 that may provide the structural support across the space between surfaces 106, 108 where support 120 connects. Support body 122 may define a number of other structural features to enable removal of support 120 through twisting moment. Support body 122 may be generally planar, having a width substantially greater than its thickness and providing a structure that may allow flexion or torsion along its width and length as a force, such as a striking force, is applied. Support body 122 may include a central portion 124 connected to two or more wings 130, 150. In some embodiments, central portion 124 is substantially equidistant from various connection points with the surface(s) of component 120. Central portion 124 may have a distinctive shape or geometry that distinguishes it from wings 130, 150 or it may be continuous with wings 130, 150 and merely represent the area proximate the midpoint between their distal surfaces 132, 152. Note that the two wings 130, 150 are only by example and support 120 may include any number of wings depending on the configuration of component 100 and the number of connection points it requires for proper support.

In the example shown, wings 130, 150 extend from central portion 124 in substantially opposite directions. Note that, in other configurations, wings 130, 150 may be angled in a non-parallel fashion relative to one another as appropriate to the configuration. Wings 130, 150 each have distal surfaces 132, 152 adjacent to surfaces 106, 108 of component 100. Wings 130, 150 may also be generally planar and have lateral sides 134, 136, 154, 156, upper surfaces 138, 158 and lower surfaces (not shown).

Wings 130, 150 may also include midlines 140, 160 used to define certain asymmetrical features on each wing. In some embodiments, midlines 140, 160 may be used to define portions of distal surfaces 132, 152 that are connection surfaces 142, 162 and connector-free surfaces 144, 164. Connection surfaces 142, 162 are attached to connectors 180, 185, 190, 195. Connector-free surfaces 144, 164 have no connectors and are free floating relative to component surfaces 106, 108. In some embodiments, midlines 140, 160 may be used to define laterally positioned flexibility increasing and flexibility decreasing features of wings 130, 150. For example, wings 130, 150 may define openings 146, 166 on one side of midlines 140, 160 and reinforcement structures 148, 168 on the other side. Openings 146, 166 are voids in the structure of wings 130, 150 that increase the flexibility of wings 130, 150 and facilitate the translation of twisting moment to connectors 180, 185, 190, 195. Reinforcement structures 148, 168 are additional material added to the surface (such as upper surfaces 138, 158 of wings 130, 150 to increase the rigidity of wings 130, 150 in the area where they are placed and act as a lever for translating striking force to the distal surfaces 132, 152 of wings 130, 150 as twisting moment around connectors 180, 185, 190, 195. In the example shown, reinforcement structures 148, 168 are triangular members extending from upper surfaces 138, 158, but other shapes for thickening some or all of that portion of the wing are also possible.

In some embodiments, support 120 includes a removal structure 170 that includes a body for receiving a striking force and transferring it through support 120 such that a twisting moment is generated around connectors 180, 185, 190, 195. Removal structure 170 may define at least one striking surface 172 for receiving the striking force aligned with a direction of applied force 174. For example, striking surface 172 may receive one or more hammer strikes to separate connectors 180, 185, 190, 195 from surfaces 106, 108. In other embodiments, removal structure 170 may engage mechanically-driven hammers, electrically-driven hammers, pneumatically-driven hammers, a stamping instrument, a press, a milling surface, etc. or provide a manual interface for receiving applied force 174. Removal structure 170 may extend from one or more surfaces of support 120. In the embodiment shown, removal structure 170 extends from central portion 124, substantially perpendicular to wings 130, 150. Alternate embodiments may include a plurality of removal structures 170, for example, removal structures 170 corresponding to each wing. In the embodiment shown, removal structure 170 engages reinforcement structures 148, 168 to distribute and direct applied force 174 asymmetrically down wings 130, 150 to increase the twisting moment. Reinforcement structures 148, 168 and removal structure 170 may include removal structure interfaces 176, 178 for transferring at least some of applied force 174 along reinforcement structures 148, 168.

Connectors 180, 185, 190, 195 extend from connection surfaces 142, 162 to surfaces 106, 108. Connectors 180, 185, 190, 195 may be embodied as, or otherwise may include, breakable joints that enable support 120 to be separated from the rest of component 100. In the example shown, connectors 180, 185, 190, 195 are each tapered to a narrow contact point with surfaces 106, 108, provided a weak point along which they should break. Other methods of creating breakable joints include scoring, chamfers, voids, or localized differences in material composition. In some embodiments, connectors 180, 185, 190, 195 each have a triangular shape, meaning that they have a triangular cross-section in at least on plane extending from connection surfaces 142, 162 to surfaces 106, 108. For example, they may comprise a planar triangular extension, a cone, a pyramid, or other three-dimensional shape with a point connection narrower than a base connection. In some embodiments, connectors 180, 185, 190, 195 are arranged on the distal surfaces such that one connector is in the lateral middle of the distal surface with at least one additional connector to one side and no connectors to the other side, such that the connector in the middle of the end may act as a the pivot point of the twisting moment created when the support is struck. For example, connector 185 is in the lateral middle of distal surface 132 and connector 180 is to one side, the two sides defining connector surface 142. There is no connector to the other side of connector 184, defining connector-free surface 144. Each group of connectors on a distal surface and connected to a common surface may be referred to as a set of connectors.

It is understood that a single component 100 may include multiple supports 120 therein. In this case, the various supports 120 formed with component 100 may be structurally independent from each other yet positioned in a single hollow interior of component 100. Although a single support 120 is illustrated by example in FIG. 1, it is understood that component 100 can be fabricated to include any desired number of supports 120 therein. In this case, each support 120 may be substantially axially aligned end-to-end with another support 120 through respective removal structure(s) 170. More specifically, removal structures 170 of each support 120 can be substantially aligned with their counterparts in other supports 120. As described elsewhere herein, an axial striking force can be imparted to removal structure(s) 170 of one support 120 can destroy connectors 180, 185, 190, 195 to dislodge wings 130, 150 of support 120 from component 100. The dislodged removal structures 170 can then contact axially aligned removal structures 170 of another support 120 to also destroy connectors 180, 185, 190, 195 thereof. The relative positioning of each support 120 can therefore allow multiple supports 120 to be removed in a single process, e.g., by striking only one removal structure 170 of one support 120.

Figure 2:
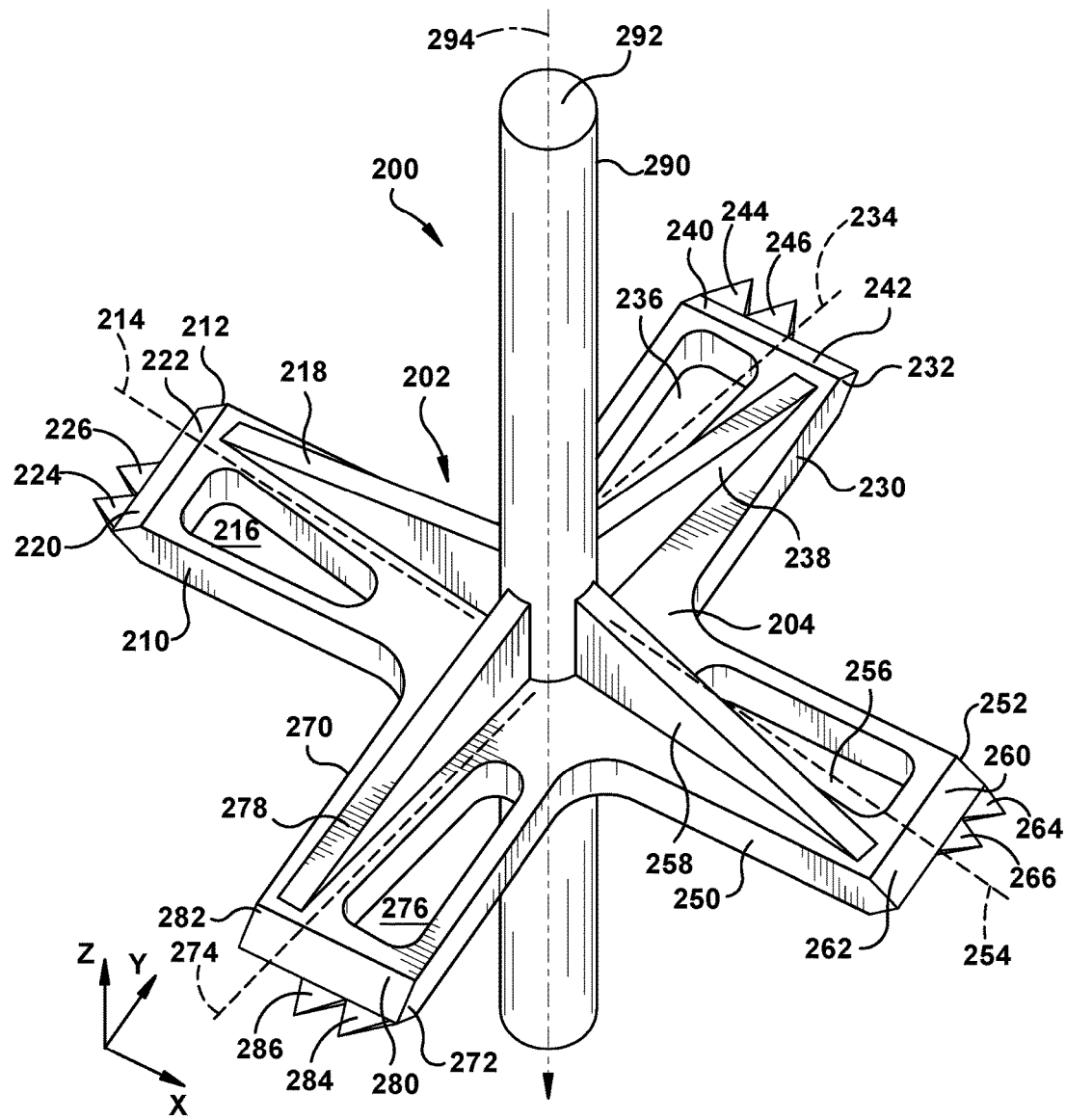
FIG. 2 provides a perspective view of another example removable support after separation from a component.

FIG. 2 shows another example removable support 200 after separation from a component (e.g., component 100 (FIG. 1)) and demonstrates a configuration with more than two wings. The example support 200 shown includes four wings 210, 230, 250, 270 that extend from a central portion 204 and comprise a support body 202 that is substantially planar. Support 200 may otherwise be structurally identical or at least substantially similar to support 120 described above. Wings 210, 230, 250, 270 may include distal surfaces 212, 232, 252, 272 and midlines 214, 234, 254, 274 that divide wings 210, 230, 250, 270 into lateral zones (though not necessarily symmetrical or equal lateral zones). Wings 210, 230, 250, 270 may include openings 216, 236, 256, 276 on one side of midlines 214, 234, 254, 274 and reinforcement structures 218, 238, 258, 278 on the other side of midlines 214, 234, 254, 274. On distal surfaces 212, 232, 252, 272, Wings 210, 230, 250, 270 may include connector surfaces 220, 240, 260, 280 on one side of midlines 214, 234, 254, 274 and connector-free surfaces 222, 242, 262, 282 on the other side of midlines 214, 234, 254, 274.

Support 200 may also include a removal structure 290 to assist in receiving and applied force 294 via a striking surface 292. In some embodiments, removal structure 290 projects from central portion 204 and engages reinforcement structures 218, 238, 258, 278 before ending in striking surface 292. Therefore, each of wings 210, 230, 250, 270 may receive a portion of applied force 294 channeled along reinforcement structures 218, 238, 258, 278 to create a twisting moment along distal surfaces 212, 232, 252, 272 of each wing. As described elsewhere herein, support 200 may be one of multiple supports formed within a respective component, each of which may be substantially axially aligned end-to-end along respective removal structures 290. Thus, multiple supports 200 can be removed together by way of a single striking motion where desired and/or applicable.

Wings 210, 230, 250, 270 may each terminate in distal surfaces 212, 232, 252, 272 with connector surfaces 220, 240, 260, 280. Connectors 224, 226 may extend from connector surface 220 and define a first set of connectors associated with first wing 210. Connectors 244, 246 may extend from connector surface 240 and define a second set of connectors associated with second wing 230. Connectors 264, 266 may extend from connector surface 260 and define a third set of connectors associated with third wing 260. Connectors 284, 286 may extend from connector surface 280 and define a fourth set of connectors associated with fourth wing 270. It is understood that each of connectors 224, 226, 244, 246, 264, 266, 284, 286 were connected to one or more surfaces, such as the surface of a component body, prior to separation of support 200. In some embodiments, a set of connectors may connect to a distal surface of an adjacent support, rather than a surface of the component body.

Figure 3:
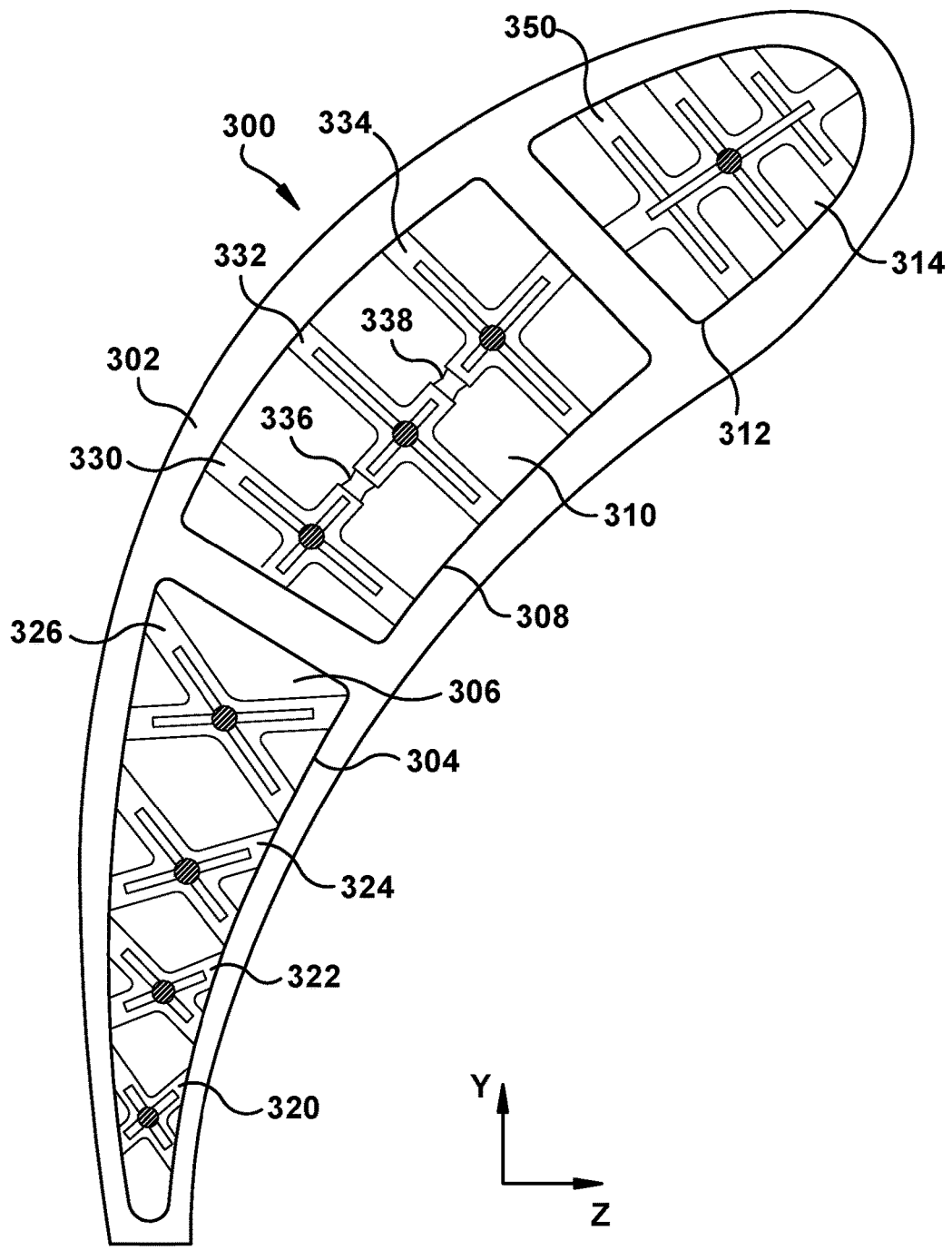
FIG. 3 provides a top view (X-Y plane view) of a laser-sintered component with a plurality of removable supports.

FIG. 3 shows a laser-sintered component 300 with a plurality of removable supports 320, 322, 324, 326, 330, 332, 334, 350 supporting the shape of component body 302 during additive manufacture. Component 300 may be a mechanical component with a number of internal surfaces 304, 308, 312 defining openings 306, 310, 314 within component 300 in need of support during manufacturing. For example, component 300 may be a laser-sintered vane or blade with a complex internal shape. Supports 320, 322, 324, 326, 330, 332, 334, 350 may be removable supports similar to supports 120, 200 described above with regard to FIG. 1 and FIG. 2 and connected at a plurality of points to surfaces 304, 308, 312 by sets of connectors. Note that supports 320, 322, 324, 326, 330, 332, 334, 350 shown in FIG. 3 are schematics intended to show various wing configurations, positions, and relationships to component body 302 and may lack various details, such as connectors and openings, shown in FIG. 1 and FIG. 2, but such features may be present in supports 320, 322, 324, 326, 330, 332, 334, 350.

A first group of supports 320, 322, 324, 326 are disposed within opening 306 and connected to surface 304 at various points. In the example shown, each of supports 320, 322, 324, 326 comprise four wings extending from a central portion of the support bodies and connecting to opposing portions of surface 304, which encloses supports 320, 322, 324, 326 in the X-Y plane. Supports 320, 322, 324, 326 demonstrate how wings on any given support may vary in their lengths and angular relationship to one another as appropriate to the component shape they are supporting.

A second group of supports 330, 332, 334 are disposed within opening 310 and connected to surface 308 at various points. In the example shown, each of supports 330, 332, 334 comprise four wings extending from a central portion of the support bodies and connecting to opposing portions of surface 308. Not all wings are connected to surface 308. Support 330 has a wing that connects to support 332 at support-to-support connection 336. Support 332 has a wing that connects to support 330 at support-to-support connection 336 and a wing that connects to support 334 at support-to-support connection 338. Support 334 has a wing that connects to support 332 at support-to-support connection 338. Note that support-to-support connections 336, 338 may be breakable connections similar to the connections to surface 308. In some embodiments, they may be implemented by a set of connectors with a base connection to the distal surface of one support's wing and a point connection to the distal surface of the adjacent support's wing.

Support 350 is its own group, disposed within opening 314 and connecting to surface 312 at eight distinct connections. Support 350 demonstrates a configuration of a single support with an extended central portion supporting eight wings. Each wing functions similarly to those in the two-wing and four-wing configurations described above and a single removal structure may distribute applied force to all eight wings.

Other configurations of supports are possible as suggested by the surfaces for connection, support needs, and desired removal process in any given implementation. For example, supports may commonly have two (2), three (3), four (4), or more than four (4) wings interconnected through a central portion of the support body. Connections may be made to the surface of the component body at various points, commonly including opposed positions, and may also include support-to-support connections.

The above-described components, supports, and parts thereof can be manufactured using any now known or later developed technologies, e.g., machining, casting, etc. In one embodiment, however, additive manufacturing is particularly suited for manufacturing components 100, 300 and supports 120, 200, 320, 322, 324, 326, 330, 332, 334, 350. As used herein, additive manufacturing (AM) may include any process of producing an object through the successive layering of material rather than the removal of material, which is the case with conventional processes. Additive manufacturing can create complex geometries without the use of any sort of tools, molds or fixtures, and with little or no waste material. Instead of machining components from solid billets of metal, much of which is cut away and discarded, the only material used in additive manufacturing is what is required to shape the part. Additive manufacturing processes may include but are not limited to: 3D printing, rapid prototyping (RP), direct digital manufacturing (DDM), selective laser melting (SLM) and direct metal laser melting (DMLM). In the current setting, DMLM has been found advantageous.

Figure 4:
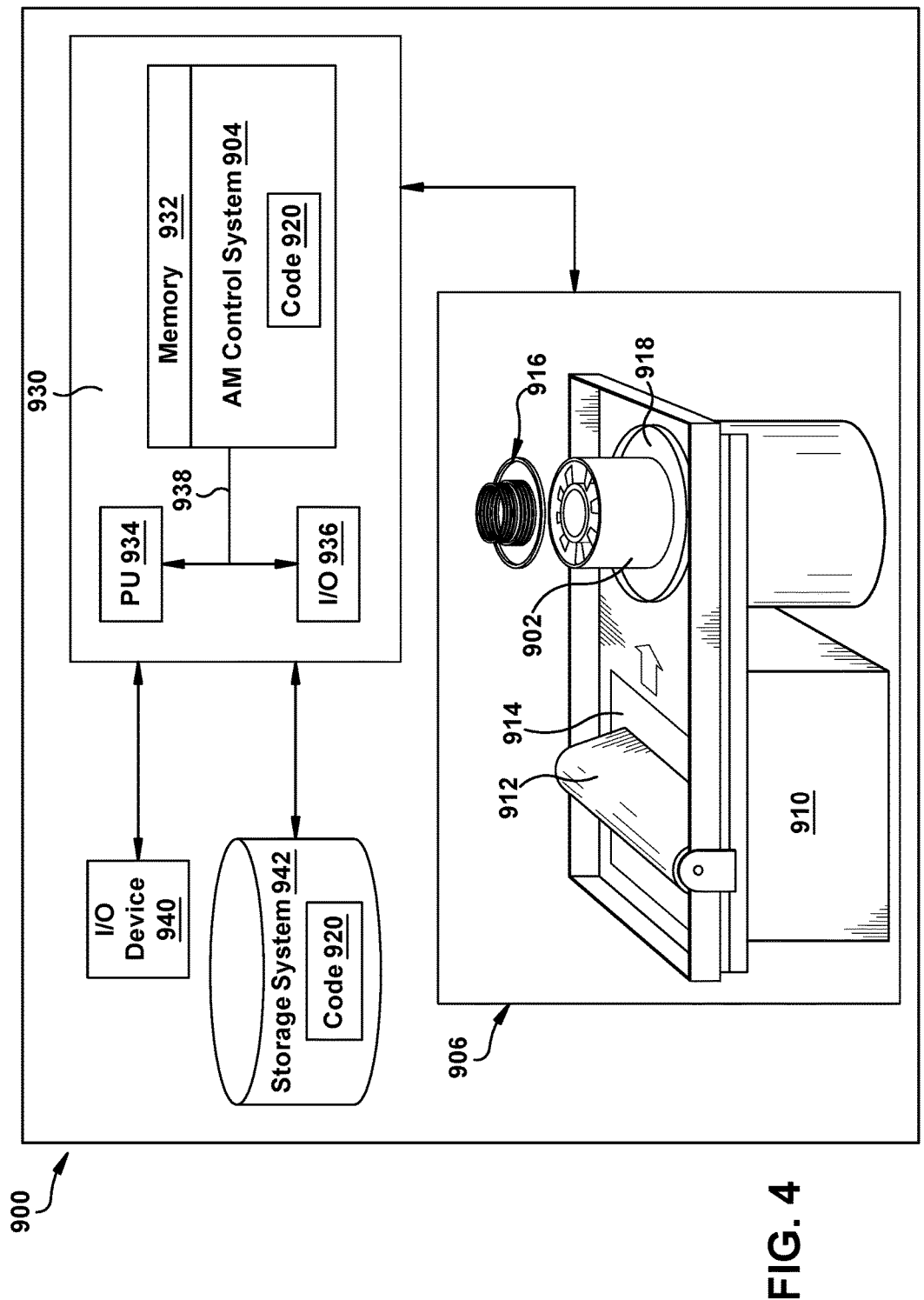
FIG. 4 shows a block diagram of an additive manufacturing process including a non-transitory computer readable storage medium storing code representative of a component and removable support.

To illustrate an example additive manufacturing process, FIG. 4 shows a schematic/block view of an illustrative computerized additive manufacturing system 900 for generating an object 902. In this example, system 900 is arranged for DMLM. It is understood that the general teachings of the disclosure are equally applicable to other forms of additive manufacturing. Object 902 is illustrated as a double walled turbine element; however, it is understood that the additive manufacturing process can be readily adapted to manufacture components with removable supports therein. AM system 900 generally includes a computerized additive manufacturing (AM) control system 904 and an AM printer 906. AM system 900, as will be described, executes code 920 that includes a set of computer-executable instructions defining components 100, 300 and supports 120, 200, 320, 322, 324, 326, 330, 332, 334, 350 to physically generate one or more of these objects using AM printer 906. Each AM process may use different raw materials in the form of, for example, fine-grain powder, liquid (e.g., polymers), sheet, etc., a stock of which may be held in a chamber 910 of AM printer 906. In the instant case, components 100, 300 and supports 120, 200, 320, 322, 324, 326, 330, 332, 334, 350 may be made of stainless steel or similar materials. As illustrated, an applicator 912 may create a thin layer of raw material 914 spread out as the blank canvas from which each successive slice of the final object will be created. In other cases, applicator 912 may directly apply or print the next layer onto a previous layer as defined by code 920, e.g., where the material is a polymer. In the example shown, a laser or electron beam 916 fuses particles for each slice, as defined by code 920. Various parts of AM printer 906 may move to accommodate the addition of each new layer, e.g., a build platform 918 may lower and/or chamber 910 and/or applicator 912 may rise after each layer.

AM control system 904 is shown implemented on computer 930 as computer program code. To this extent, computer 930 is shown including a memory 932, a processor 934, an input/output (I/O) interface 936, and a bus 938. Further, computer 930 is shown in communication with an external I/O device/resource 940 and a storage system 942. In general, processor 934 executes computer program code, such as AM control system 904, that is stored in memory 932 and/or storage system 942 under instructions from code 920 representative of components 100, 300 and supports 120, 200, 320, 322, 324, 326, 330, 332, 334, 350, described herein. While executing computer program code, processor 934 can read and/or write data to/from memory 932, storage system 942, I/O device 940 and/or AM printer 906. Bus 938 provides a communication link between each of the components in computer 930, and I/O device 940 can comprise any device that enables a user to interact with computer 940 (e.g., keyboard, pointing device, display, etc.). Computer 930 is only representative of various possible combinations of hardware and software. For example, processor 934 may comprise a single processing unit, or be distributed across one or more processing units in one or more locations, e.g., on a client and server. Similarly, memory 932 and/or storage system 942 may reside at one or more physical locations. Memory 932 and/or storage system 942 can comprise any combination of various types of non-transitory computer readable storage medium including magnetic media, optical media, random access memory (RAM), read only memory (ROM), etc. Computer 930 can comprise any type of computing device such as a network server, a desktop computer, a laptop, a handheld device, a mobile phone, a pager, a personal data assistant, etc.

Additive manufacturing processes begin with a non-transitory computer readable storage medium (e.g., memory 932, storage system 942, etc.) storing code 920 representative of components 100, 300 and supports 120, 200, 320, 322, 324, 326, 330, 332, 334, 350. As noted, code 920 includes a set of computer-executable instructions defining outer electrode that can be used to physically generate the tip, upon execution of the code by system 900. For example, code 920 may include a precisely defined 3D model of outer electrode and can be generated from any of a large variety of well-known computer aided design (CAD) software systems such as AutoCAD®, TurboCAD®, DesignCAD 3D Max, etc. In this regard, code 920 can take any now known or later developed file format. For example, code 920 may be in the Standard Tessellation Language (STL) which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional object to be fabricated on any AM printer. Code 920 may be translated between different formats, converted into a set of data signals and transmitted, received as a set of data signals and converted to code, stored, etc., as necessary. Code 920 may be an input to system 900 and may come from a part designer, an intellectual property (IP) provider, a design company, the operator or owner of system 900, or from other sources. In any event, AM control system 904 executes code 920, dividing components 100, 300 and supports 120, 200, 320, 322, 324, 326, 330, 332, 334, 350 into a series of thin slices that it assembles using AM printer 906 in successive layers of liquid, powder, sheet or other material. In the DMLM example, each layer is melted to the exact geometry defined by code 920 and fused to the preceding layer. Subsequently, the outer electrode may be exposed to any variety of finishing processes, e.g., minor machining, sealing, polishing, assembly to other part of components 100, 300 and supports 120, 200, 320, 322, 324, 326, 330, 332, 334, 350, etc.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
additively manufacturing a laser-sintered component having at least one surface and a removable support extending from and connected to the at least one surface, the removable support further comprising:
a support body having at least a first wing with a first distal surface and a first lateral midline bisecting the first distal surface and a second wing with a second distal surface and a second lateral midline bisecting the second distal surface;
a first set of connectors projecting from the first distal surface on a first side of the first lateral midline and connected to the at least one surface, wherein the first distal surface defines a first connector-free portion on a second side of the first lateral midline; and
a second set of connectors projecting from the second distal surface on a first side of the second lateral midline and connected to the at least one surface, wherein the second distal surface defines a second connector free portion on a second side of the second lateral midline; and
striking the removable support of the laser-sintered component to separate the first set of connectors and the second set of connectors from the at least one surface by twisting the support body.

2. The method of claim 1, wherein:
the first set of connectors comprises a plurality of triangular connectors, each of the first set of connectors having a side connected to the first distal surface and a point connected to the at least one surface; and
the second set of connectors comprises a plurality of triangular connectors, each of the second set of connectors having a side connected to the second distal surface and a point connected to the at least one surface.

3. The method of claim 1, wherein:
the first wing defines a first opening on the first side of the first lateral midline; and
the second wing defines a second opening on the first side of the second lateral midline.

4. The method of claim 1, wherein:
the first wing further comprises a first reinforcing structure projecting from the first wing on the second side of the first lateral midline; and
the second wing further comprises a second reinforcing structure projecting from the second wing on the second side of the second lateral midline.

5. The method of claim 4, wherein the removable support further comprises a removal structure perpendicular to the first wing and the second wing and having a removal surface and wherein the striking step includes striking the removal surface of the removal structure.

6. The method of claim 5, wherein the removal structure is connected to the first reinforcing structure and the second reinforcing structure.

7. The method of claim 1, wherein the first wing and the second wing are two of a plurality of wings having substantially similar structures and the plurality of wings consists of a number of wings selected from two, three, four, and greater than four.

8. A removable support for an additively manufactured, laser-sintered component having at least one surface, the removable support comprising:
a support body having at least a first wing with a first distal surface and a first lateral midline bisecting the first distal surface and a second wing with a second distal surface and a second lateral midline bisecting the second distal surface;
a first set of connectors projecting from the first distal surface on a first side of the first lateral midline and connected to the at least one surface, wherein the first distal surface defines a first connector-free portion on a second side of the first lateral midline; and
a second set of connectors projecting from the second distal surface on a first side of the second lateral midline and connected to the at least one surface, wherein the second distal surface defines a second connector free portion on a second side of the second lateral midline.

9. The removable support of claim 8, wherein:
the first set of connectors comprises a plurality of triangular connectors, each of the first set of connectors having a side connected to the first distal surface and a point connected to the at least one surface; and
the second set of connectors comprises a plurality of triangular connectors, each of the second set of connectors having a side connected to the second distal surface and a point connected to the at least one surface.

10. The removable support of claim 8, wherein:
the first wing defines a first opening on the first side of the first lateral midline; and
the second wing defines a second opening on the first side of the second lateral midline.

11. The removable support of claim 8, wherein:
the first wing further comprises a first reinforcing structure projecting from the first wing on the second side of the first lateral midline; and
the second wing further comprises a second reinforcing structure projecting from the second wing on the second side of the second lateral midline.

12. The removable support of claim 11, wherein the removable support further comprises a removal structure perpendicular to the first wing and the second wing and having a removal surface.

13. The removable support of claim 12, wherein the removal structure is connected to the first reinforcing structure and the second reinforcing structure.

14. The removable support of claim 8, wherein the first wing and the second wing are two of a plurality of wings having substantially similar structures and the plurality of wings consists of a number of wings selected from two, three, four, and greater than four.

15. A non-transitory computer readable storage medium storing code representative of a removable support for an additively manufactured, laser-sintered component having at least one surface, the removable support being physically generated upon execution of the code, the removable support comprising:
a support body having at least a first wing with a first distal surface and a first lateral midline bisecting the first distal surface and a second wing with a second distal surface and a second lateral midline bisecting the second distal surface;
a first set of connectors projecting from the first distal surface on a first side of the first lateral midline and connected to the at least one surface, wherein the first distal surface defines a first connector-free portion on a second side of the first lateral midline; and
a second set of connectors projecting from the second distal surface on a first side of the second lateral midline and connected to the at least one surface, wherein the second distal surface defines a second connector free portion on a second side of the second lateral midline.

16. The removable support of claim 15, wherein:
the first set of connectors comprises a plurality of triangular connectors, each of the first set of connectors having a side connected to the first distal surface and a point connected to the at least one surface; and
the second set of connectors comprises a plurality of triangular connectors, each of the second set of connectors having a side connected to the second distal surface and a point connected to the at least one surface.

17. The removable support of claim 15, wherein:
the first wing defines a first opening on the first side of the first lateral midline; and
the second wing defines a second opening on the first side of the second lateral midline.

18. The removable support of claim 15, wherein:
the first wing further comprises a first reinforcing structure projecting from the first wing on the second side of the first lateral midline; and
the second wing further comprises a second reinforcing structure projecting from the second wing on the second side of the second lateral midline.

19. The removable support of claim 15, wherein the removable support further comprises a removal structure perpendicular to the first wing and the second wing and having a removal surface.

20. The removable support of claim 15, wherein the first wing and the second wing are two of a plurality of wings having substantially similar structures and the plurality of wings consists of a number of wings selected from two, three, four, and greater than four.

* * * * *